United States Patent Office 3,136,736
Patented June 9, 1964

3,136,736
COMPOSITIONS COMPRISING POLYEPOXIDES
AND MALEIC ANHYDRIDE COPOLYMERS
Robert N. Washburne, Wyncote, and William D. Emmons, Huntingdon Valley, Pa., assignors to Rohm & Haas Company, Philadelphia, Pa., a corporation of Delaware
No Drawing. Filed Feb. 26, 1959, Ser. No. 795,592
2 Claims. (Cl. 260—45.5)

The present invention is concerned with thermosetting coating compositions comprising copolymers of acrylic esters. It is particularly concerned with coating compositions of thermosetting character which are capable of producing coatings which are resistant to household detergents and are, therefore, suitable for use as clear or pigmented finishes for household appliances.

It is known that linear acrylic ester polymers are adapted to produce flexible, hard, and durable coatings and that such coatings as contain large proportions of methyl methacrylate are especially resistant to deterioration on exposure to ultraviolet light. However, such coatings of linear addition polymers are of thermoplastic character and consequently, soluble in common organic solvents and susceptible to flow on heating. It is also known to introduce materials which may or may not be of resin-forming character which are adapted to cross-link copolymers of acrylic esters to insoluble and infusible or heat-resistant condition. For example, it is known to form coating compositions from a mixture of styrene, acrylic acid, and acrylic ester copolymers and a resin-forming polyepoxide, the latter serving to cross-link the acrylic ester copolymer by reaction with the acid groups therein. However, the coatings thereby obtained are not sufficiently resistant to many modern detergents, particularly those containing alkaline phosphates, ethylene oxide condensates of, and sulfonates and sulfates of, higher $C_8$ to $C_{18}$ fatty alcohols, acids, and amides thereof, and alkylaryl sulfonates such as ($C_3$—$C_{18}$ alkyl)phenyl or naphthyl sulfonates of which the commercially available product sold under the trade designation "Tide" is representative. Such detergents are commonly employed in the household for dishwashing, laundering, and general cleaning purposes and consequently, are normally employed for the cleaning of household appliances such as dishwashers, stoves, refrigerators, and the like.

In accordance with the present invention, it has now been found that copolymers of acrylic esters with maleic anhydride or another monoethylenically unsaturated aliphatic dicarboxylic acid anhydride can be cross-linked with resin-forming polyepoxides to form extremely resistant coatings which are suitable for application to household appliances since they are capable of resisting the effects of modern household detergents. The copolymers employed in the compositions of the present invention are those formed of a mixture of 3% to 15% by weight of an unsaturated anhydride with an ester of methacrylic acid or of acrylic acid, and optionally such mixtures containing acrylonitrile, styrene, vinyltoluene, or mixtures thereof. The copolymers may contain from 3% to 15% by weight of anhydride, but preferably from 7% to 12% by weight thereof. The balance of the copolymer may consist essentially of methyl methacrylate itself. However, a part of the methyl methacrylate may be replaced by an ester of acrylic acid with an alkanol having 1 to 18 carbon atoms, preferably those having 1 to 8, or with cyclohexanol so that the copolymer may comprise from 0% to 65% by weight of such an ester of acrylic acid. The copolymer may also contain up to 50% by weight of styrene or vinyltoluene and these monomers may be copolymerized with the anhydride and either methyl methacrylate or one of the esters of acrylic acid or with both the methyl methacrylate and an ester of acrylic acid. The polymers may also contain up to about 15% by weight of acrylonitrile. For example, the polymers of acrylonitrile with methyl methacrylate and methyl, ethyl, or butyl acrylate are contemplated and such copolymers may also include styrene or vinyltoluene.

Besides the monomers just mentioned, the copolymer may contain up to about 10% by weight of special monomers introduced for special purposes. For example, small amounts from about 0.1% to 10% of any one of the following monomers of Formulas I, II, III, IV, and V may be introduced for the purpose of increasing adhesion of the copolymer to certain substrates especially bare or primed metals, or, in some cases, for improving the dispersibility of pigments or fillers in the coating compositions.

The monomers mentioned are:

$$\begin{array}{c} CH=CH_2 \\ \diagup \\ N \\ \diagdown \\ (R°)_n \end{array} \quad (I)$$

where
R° is selected from the group consisting of H and alkyl groups having 1 to 4 carbon atoms, and
$n$ is an integer having a value of 1 to 4;

$$CH_2=C(R)AYNR^1R^2 \quad (II)$$

where
R is selected from the group consisting of H and $CH_3$,
A is selected from the group consisting of O, S, $$\overset{O}{\underset{\|}{-C-O-}}, \text{ and } \overset{O}{\underset{\|}{-C-NH-}}$$

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms;

$$CH_2=C(R)COOCH_2CONHZN\overset{Z}{\underset{\underset{O}{\overset{\|}{C}}}{\diagdown}}NH \quad (III)$$

where
R is the same as above, and
Z is an alkylene group having 2 to 3 carbon atoms.

Examples of compounds of Formula I include:

2-vinylpyridine;
3-vinylpyridine;
4-vinylpyridine;
2-methyl-5-vinylpyridine;
5-methyl-2-vinylpyridine;
4-methyl-2-vinylpyridine;
2-ethyl-5-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine.

Examples of the compounds of Formula II include:

dimethylaminoethyl acrylate and methacrylate
diethylaminoethyl acrylate and methacrylate
dimethylaminopropyl acrylate and methylacrylate
diethylaminopropyl acrylate and methacrylate
dipropylaminoethyl acrylate and methacrylate
di-n-butylaminoethyl acrylate and methacrylate
di-sec-butylaminoethyl acrylate and methacrylate
di-t-butylaminoethyl acrylate and methacrylate
dimethylaminoethyl vinyl ether and sulfide
diethylaminoethyl vinyl ether and sulfide
aminoethyl vinyl ether and sulfide
monomethylaminoethyl vinyl ether and sulfide N,N-dimethylaminoethyl acrylamide and methacrylamide
N,N-diethylaminoethyl acrylamide and methacrylamide Examples of compounds of Formula III include:

N-[β-(α-methacryloxyacetamido)ethyl]-N,N'-ethyleneurea
N-[β-(α-acryloxyacetamido)ethyl -N,N'-ethyleneurea
N-[β-(α-acryloxyacetamido)ethyl]-N,N'-trimethyleneurea
N-[β-(α-methacryloxyacetamido)ethyl]N,N'-trimethyleneurea Another type of adhesion promoting monomer is that of Formula IV

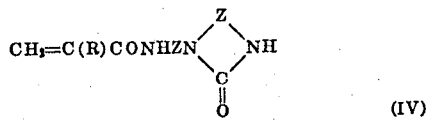

(IV)

where R and Z are defined above, of which an example is N-[β-(methacrylamido)ethyl]-N,N'-ethyleneurea.

Another special monomer improving adhesion and imparting toughness is of the formula

 (V)

where $R^3$ is selected from the group consisting of cyclohexyl, benzyl, and alkyl groups of 1 to 18 carbon atoms. Examples include methyl hydrogen maleate, ethyl hydrogen maleate, butyl hydrogen maleate, amyl hydrogen maleate, cyclohexyl hydrogen maleate, t-octyl hydrogen maleate, and octadecyl hydrogen maleate.

The anhydrides that may be employed for the present invention include maleic anhydride, itaconic anhydride, citraconic anhydride, or homologs thereof, such as dimethyl maleic anhydride.

The copolymer is generally prepared by a solution polymerization procedure. In this fashion, it is a simple matter to control the molecular weight so that the polymers obtained fall in the range of about 10,000 to 120,000 viscosity average molecular weight. The preferred copolymers generally have viscosity average molecular weights of about 15,000 to 60,000. The solvents employed are organic compounds which are free of alcoholic and phenolic hydroxyl groups. Examples include toluene, xylenes, ethoxyethyl acetate, butoxyethyl acetate, amyl acetate, butyl acetate, ethyl acetate, acetone, methyl isopropyl ketone, and dioxane. Polymerization may be effected at concentrations of about 30% to 60% monomers in the total solution. From 0.1% to 3% of an initiator of free radical type may be employed. Organic peroxides and hydroperoxides such as benzoyl peroxide, lauroyl peroxide, and t-butyl hydroperoxide can be used. Also, any of the azo catalysts such as dibutyl azodiisobutyrate and α,α'-bis-azoisobutyronitrile may be employed. The temperatures employed may range from 50° to 150° C., the preferred range being from 80° to 110° C. The time generally varies inversely with the temperature from 45 minutes to as much as 16 hours. The proportion of initiator and the temperature are controlled to provide a molecular weight within the range of 10,000 to 120,000 specified above. The polymerization may be effected by dissolving all of the monomers and the initiator in the proper proportions in the solvent and then heating to the temperature within the range desired. Alternatively, a solution of the initiator may be prepared and then gradually introduced into a mixture of the monomers which is held at the proper temperature. In this manner, solutions of the desired copolymers containing 5% to 15% of anhydride units are obtained. The solvents employed are preferably those to be used in the composition intended for coating so that it is not necessary to isolate the polymer from the polymerization solution and then redissolve it in the solvents for making up the coating composition.

In all cases, it is intended that the copolymer be obtained in such a manner as to preserve the anhydride group. In order to do this, it is essential that the polymerization be carried out in solvents which do not decompose the anhydride group or hydrolyze it. As stated before, this excludes the possibility of employing water or compounds containing amine groups, alcoholic hydroxyl groups or phenolic hydroxyl groups.

To the solution of polymer there is added a polyepoxide. The polyepoxides contemplated as those which contain at least two epoxy groups in which the oxygen is attached to adjacent carbon atoms connected together in a chain by a single valence bond. These epoxy groups may be termed vic-epoxy groups. The preferred polyepoxides are those which contain a terminal epoxy group of the formula

These resin-forming polyepoxides may be termed "ethoxyline" resins and are more particularly defined as organic compounds free of functional groups other than hydroxyl and epoxy groups which contain at least two vic-epoxy groups in which the oxygen is attached to adjacent singly-bonded carbon atoms and which have a molecular weight in the range of about 250 to 5,000.

Polyepoxides that may be used include glycol-bis-exo-dihydrodicyclopentadienyl ethers having the general formula:

$$O'=C_{10}H_{13}-O-R-O-C_{10}H_{13}=O' \qquad (VI)$$

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula (R'—O—)xR' in which R' is an alkylene group of 2 to 4 carbon atoms and x is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)-2,2-propane may be formulated as follows:

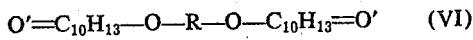

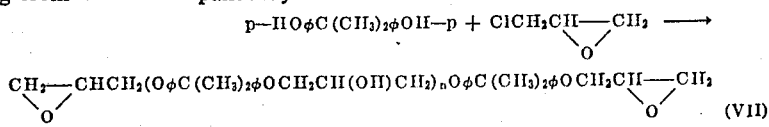

(VII)

where φ is the phenylene group and n has an average value varying from around zero to about 7. These resins may be made by the method disclosed in 2,324,-483, 2,444,333, British Patents 518,057 and 579,698. Many of these ethoxyline resins are sold under the name of Epon resins or Araldite resins. These commercial products are usually mixtures of compounds having one or two or more vicinal epoxy groups per molecule so that their average composition may be expressed in terms of an average value of epoxide groups per molecular weight, such as 1.4, 1.5, 1.7, 2.1, or 2.4 etc. The effective portion of such mixtures is, of course, the component or components containing 2 or more vicinal epoxide groups. Data on the Epon resins are given in the table below:

TABLE I

| Epon No. | Epoxide equivalent | Approximate esterification equivalent | M.P., 0° C. |
|---|---|---|---|
| RN-34 | 225-290 | 105 | 20-28 |
| RN-48 | 192 | 80 | 9 |
| 834 | 254 | 100 | Liquid |
| 864 | 337 | 105 | 45 |
| 1064 | 300-375 | 105 | 40-45 |
| 1062 | 140-165 | | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

Also, there may be used polyepoxides of the formula

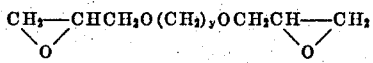
(VIII)

where $y$ is a number having an average value of 2 to 4. Epon 562 is of this type, is liquid at normal room conditions, and has an average "Epoxide Equivalent" value of 153. Also, a diepoxide or triepoxide of glycerol may be used. These aliphatic polyepoxides may be prepared in the known fashion as described, for example, in U.S. Patents 2,730,427 and 2,752,269. The preferred polyepoxides are those having average molecular weights of about 250 to 1,000. The average molecular weight of a diepoxide is twice the epoxide equivalent value and that of a triepoxide is three times the epoxide equivalent value.

The proportion of polyepoxide or ethoxyline resin may be from about 10 to 30% by weight, based on the total weight of polyepoxide and anhydride copolymer. A preferred proportion is about 15 to 20%. Surprisingly, it is apparently not essential that the amount of polyepoxide used correspond precisely with the amount of anhydride functional groups in the copolymer. However, it is generally preferred to provide the composition with a proportion of ethoxyline resin such that there is at least one equivalent of an epoxy group for one equivalent of anhydride function or group. An excess of epoxide over anhydride as high as 10 to 15% is frequently preferred. In all cases, the polyepoxide is chosen such that it is compatible with the copolymer in the coating composition in the final film. Naturally, its compatibility depends upon the composition of the copolymer as well as the particular composition of the polyepoxide. At some point before use of the coating composition, which contains, dissolved in the organic solvent, the anhydride copolymer and ethoxyline resin, there is added a catalyst for accelerating the reaction between the anhydride copolymer and the polyepoxide. Suitable catalysts which can be used for this purpose include tertiary amines and quaternary ammonium bases as well as the salts of the tertiary amines and the quaternary ammonium bases. Examples of the tertiary amines include benzyldimethylamine, triethylamine, triethanolamine, pyridine, piperidine, dimethylaniline, diethylenetriamine, mono- and di-salts of these amines with acids such as maleic acid, succinic acid, malonic acid, and so on. Examples of the quaternary ammonium compounds include benzyltrimethylammonium hydroxide, chloride, or sulfate; tetramethylammonium chloride or acetate; dimethylphenylbenzylammonium chloride; and the oxyethylene quaternary ammonium compounds of the formula

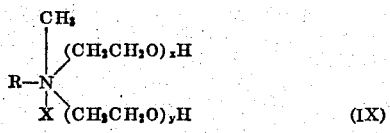
(IX)

where
R is an alkyl group of 8 to 18 carbon atoms,
X is an anion, such as OH, Cl, OSO$_3$H, etc., and
$x+y=1$ to 30.

The amount of catalyst employed may be from about 0.1% to 5% by weight, based on the total weight of anhydride copolymer and ethoxyline resin.

The composition before the addition of the catalyst is quite stable and can be stored indefinitely without incurring substantial deterioration. After the addition of catalyst, storage at normal room temperatures is satisfactory over a period of about 2 to 3 weeks, but improved stability can be obtained by introducing a small amount of maleic acid such as from about 1 to about 5% of such acid, based on the entire weight of the composition. Instead of maleic acid, other acids, such as acetic acid, acrylic acid, methacrylic acid, hydrochloric acid, oxalic acid, or succinic acid, may be used.

The compositions may be employed to form clear, transparent coatings or pigments, fillers, delustrants, and/or other additives may be included to vary the gloss, transparency, color or the like. By the term "pigment," it is intended to include insoluble materials which may be white or may have coloring values as well as those which serve simply as extenders. The most common ratio or binder to pigment is in the range of 30:70 to 70:30. The pigment may, however, vary from 1 to 80% by weight of the binder. The preferred proportion for white pigments is from 30 to 55% by weight of total binder.

The coating compositions may be applied to any rigid or substantially rigid substrate which may be formed, or the surface of which may be formed, with paper, wood, textiles, fiberglass laminates, ceramics, concrete, brick, masonry, leather, plastics, and metals. In the case of metals, the coatings may be employed as primers particularly when they have adhesion-promoting monomers therein; they may be employed as topcoatings; or they may be employed both as primers and topcoats in the same application. They may be used, therefore, for coating household appliances formed of iron, steel, aluminum, or chromium. As stated previously, the coatings obtained with the compositions herein are particularly advantageous for the coating of such household appliances since they are resistant to modern household detergents which the housewife may frequently employ in washing the coated surfaces. The coatings may be employed for the coating of wire since they are tough yet flexible and resistant to abrasion. Those compositions formed exclusively of the anhydride and acrylic ester monomers may be employed for uses such as in coating automobile bodies, where resistance to exposure to ultraviolet light is required.

The coating composition whther clear or pigmented which contains the curing catalyst (either a tertiary amine, its salts, or a quaternary ammonium compound) may be applied to the substrate to be coated in any suitable fashion as by brushing, spraying, or dipping, the concentration of the solution being adjusted depending upon the particular method of application. For example, in spraying, white-pigmented compositions may contain from 40 to 50% solids which includes from about 5 to 25% by weight, based on the weight of the entire composition, of the binder formed of the anhydride copolymer and ethoxyline resin.

After application of the composition to the substrate, the latter is dried and subjected to a baking operation. The drying and baking may simply be one continuous or simultaneous operation or it may involve two distinct stages. Thus, drying may be effected simply by exposure to the air at normal room temperature or by subjecting the coated substrate to heat such as heated atmospheres in a tunnel drier or oven, to high frequency radiation, infra-red, induction heating, or the like. The baking operation may be effected at temperatures of 60° C. to 450° C. for periods of time inversely related thereto, such as from one-half hour at the lower temeprature to ¼ minute at the higher temuperature. Advantageously, a period of about 5 minutes at 250° C. may be employed.

The epoxide resins referred to in the following examples are the following:

Epoxide A is a condensation product of epichlorohydrin and 4,4'-isopropylidene-bisphenol (commonly called Bisphenol A) having the following characteristics: an epoxy equivalent of about 193, an equivalent weight of about 75, a Gardner-Holdt viscosity of about Z6 (100% solids at 25° C.), a melting point of 8° to 12° C., soluble in toluene and xylene;

Epoxide B is a condensation product of epichlorohydrin and Bisphenol A having the following characteristics: an epoxy equivalent of about 337, a melting point of 40° to 45° C., an equivalent weight of about 100, a Gardner-Holdt viscosity of about A at 25° C. and 40% by weight in diethylene glycol monobutyl ether, soluble in xylene and toluene;

Epoxide C is a reaction product of glycerine and epichlorohydrin having the following characteristics: an epoxy equivalent (grams of resin containing 1 g.-equivalent of epoxide) of about 150, an equivalent weight of about 60 (grams of resin required to esterify 1 g.-mole of acetic acid), a viscosity at 25° C. of about E at 100% solids, soluble in water, methanol, acetone, benzene, and toluene;

Epoxide D is a condensation product of ethylene glycol and epichlorohydrin having the following characteristics: an epoxy equivalent of about 200, an equivalent weight of about 80, a viscosity of about Z5 (100% solids at 25° C.), soluble in methanol, acetone, benzene, and toluene;

Epoxide E is a condensation product of epichlorohydrin with 4,4'-isopropylidene-bisphenol (commonly called Bisphenol A) having the following characteristics: an epoxy equivalent of about 500, an equivalent weight of about 130, melting point range 64° to 76° C., soluble in toluene, xylene;

Epoxide F is a condensation product of epichlorohydrin and Bisphenol A having the following characteristics: an epoxy equivalent of about 1700, an equivalent weight of about 190, a melting point range of 127° to 133° C., soluble in toluene, and xylene;

Epoxide G is a condensation product of epichlorohydrin and a mixture of ethylene glycol and diethylene glycol having the following characteristics: an epoxy equivalent of about 175, an equivalent weight of about 75, a viscosity at 25° C. of Z6, soluble in xylene and toluene.

The following examples, in which the parts and percentages are by weight, are illustrative of the invention.

*Example 1*

(a) To styrene (45 parts), methyl methacrylate (45 parts), and maleic anhydride (10 parts) was added 2-ethoxyethyl acetate (122.2 parts) and benzoyl peroxide (1 part). One-fourth of this mixture was then heated to 110° C. At this temperature, the gradual addition of the remaining monomer-solvent-catalyst mixture was begun and required one hour and fifty-five minutes to complete. Re-initiations of benzoyl peroxide (0.1 part) were made at three, four, and five hours' reaction time. The total reaction time was eight hours. A polymer solution at about 45% solids was thus obtained and was diluted to 40% solids by addition of 2-ethoxyethyl acetate. The diluted polymer solution had a Gardner-Holdt viscosity of "Y—" at 25° C., and an average molecular weight of about 50,000.

(b) To the diluted polymer solution (92 parts) of part (a) was added Epoxide A (8 parts) and 2-ethoxyethyl acetate (12 parts). To this blend was added 0.7 part of a 35% solution of trimethylbenzylammonium hydroxide in methanol. Films of this solution were cast on cold rolled steel, air-dried for thirty minutes, and baked for thirty minutes at 150° C. (300° F.). The clear, flexible coatings thus produced exhibited excellent resistance to 2-ethoxyethyl acetate, good adhesion, and excellent resistance to detergents, including that now commercially available under the trade name Tide.

(c) Part (b) was repeated substituting in consecutive runs 8 parts of each of Epoxides B through G respectively with similar results.

*Example 2*

To methyl methacrylate (36.5 parts), styrene (21.5 parts), and ethyl acrylate (30 parts) were added maleic anhydride (10 parts), glacial methacrylic acid (2 parts), xylene (48.9 parts), 2-ethoxyethyl acetate (73.3 parts), and benzoyl peroxide (1.5 parts). One-fourth of this mixture was heated to 110° C. At this temperature (zero reaction time), and the gradual addition of the remaining monomer-solvent-catalyst mixture was begun, and required one hour and five minutes to complete. Re-initiations with benzoyl peroxide (0.15 part) were made at three, four, and five hours' reaction time. The total polymerization cycle was eight hours, producing a polymer solution at 45% solids, which was diluted to 40% solids by the addition of a mixture of 2-ethoxyethyl acetate—xylene (60:40 weight ratio). The polymer solution had a Gardner-Holdt viscosity of "O—" at 25° C. and 40% solids, and an average molecular weight of about 30,000.

To the above polymer solution at 40% solids (92 parts) was added Epoxide A (8 parts), 2-ethoxyethyl acetate (12 parts), and catalyst (a quaternary ammonium compound of Formula IX in which X is chlorine and $x$ plus $y$ equals about 15, probably averaging about 7 to 8 each) (0.67 part). Films of this solution were cast on cold rolled steel, air-dried for thirty minutes, and baked for thirty minutes at 150° C. (300° F.). The clear, flexible films thus produced exhibited excellent resistance to 2-ethoxyethyl acetate, good adhesion, and excellent resistance to detergents.

*Example 3*

To styrene (44 parts), methyl methacrylate (44 parts), and maleic anhydride (10 parts) were added methacrylic acid (2 parts), 2-ethoxyethyl acetate (73.3 parts), xylene (48.9 parts), and benzoyl peroxide (1.5 parts). One-fourth of the above mixture was heated to 110° C. When this temperature was reached, the remaining monomer-solvent-catalyst mixture was added gradually, this operation requiring one hour and five minutes to complete. Re-initiations with benzoyl peroxide (0.15 part) were made at three, four, and five hours' reaction time. The total reaction time was eight hours. The resulting polymer solution was at about 45% solids, and was diluted to 40% solids with a mixture of 2-ethoxyethyl acetate/xylene (3:2 weight ratio). The polymer solution had a Gardner-Holdt viscosity of "U+" at 25° C. and 40% solids, and an average molecular weight of about 30,000.

To the diluted polymer solution (90 parts) were added Epoxide B (14 parts), 2-ethoxyethyl acetate (13 parts), xylene (8 parts), and catalyst (a quaternary ammonium compound of Formula IX in which X is chlorine and $x$ plus $y$ equals about 15, probably averaging about 7 to 8 each) (0.75 part). Films of this solution were cast on cold rolled steel, air-dried for thirty minutes, and baked for thirty minutes at 150° C. (300° F.). The clear coatings thus produced exhibited excellent flexibility, good adhesion, good resistance to 2-ethoxyethyl acetate, and good resistance to Tide.

*Example 4*

(a) To styrene (44 parts), methyl methacrylate (44 parts), and maleic anhydride (10 parts) was added a solution of 2 parts of N-[β-(α-methacryloxyacetamido)-ethyl]-N,N'-ethyleneurea in 122.2 parts of 2-ethoxyethyl acetate, and benzoyl peroxide (1.0 part). One-fourth of this mixture was heated to 110° C. When this temperature was reached (zero reaction time), the gradual addition of the remaining monomer-solvent-catalyst mixture was begun. This addition took two hours and ten minutes to complete. Re-initiations with benzoyl peroxide (0.10 part) were made at three, four, and five hours' reaction time. The total polymerization cycle was eight hours and produced a polymer solution at about 45% solids in 2-ethoxyethyl acetate. The polymer solution was diluted to 40% solids by the addition of 2-ethoxyethyl acetate and had a Gardner-Holdt viscosity of about "Z1" at 25° C., and an average molecular weight of about 50,000.

(b) To the above polymer solution at 40% solids (92 parts) were added 8 parts of Epoxide A, 12 parts of 2-ethoxyethyl acetate, and 0.7 part of a 35% solution of trimethylbenzylammonium hydroxide in methanol. Films of this mixture were cast on cold rolled steel, air-dried for thirty minutes, and baked for thirty minutes at 150° C. (300° F.). The clear, hard, and flexible films thus produced exhibited good to excellent adhesion and resistance to 2-ethoxyethyl acetate.

(c) An enamel was prepared by adding 60 parts of rutile titanium dioxide to 40 parts of the uncatalyzed coating composition prepared in (b). This mixture was passed through a three-roll mill, after which operation an additional 142 parts of the uncatalyzed coating composition of part (b), 9 parts of toluene, and 9 parts of 2-ethoxyethyl acetate were added. The enamel thus produced had total solids composed of 45% titanium dioxide and 55% acrylic-epoxide solids. The enamel was at 46% total solids, and had a viscosity of 62 seconds (No. 4 Ford Cup) at 25° C.

To 100 parts of the above enamel were added toluene (6 parts) and 2-ethoxyethyl acetate (6 parts). This gave an enamel solution which was sprayable, being at 41% total solids and having a viscosity of 26 seconds (No. 4 Ford Cup) at 25° C. Trimethylbenzylammonium hydroxide (40% in water) (0.13 part) was added. The enamel was sprayed on unprimed Bonderite panels (phosphatized) and on Bonderite panels which had been coated with a commercial primer (epoxy type). The sprayed panels were baked at 150° C. (300° F.) for thirty minutes. The coatings thus produced exhibited good adhesion, gloss, flexibility, 2-ethoxyethyl acetate resistance, and detergent (Tide) resistance (see (d) below).

(d) Tide resistance data:

Panels prepared in (c) above were used for this test. The edges of the coated panels were sealed with shellac, dried, and then were placed half-submerged in a bath of 1% Tide (by weight) at 165° F. The panels were examined periodically for blisters and dulling, the blisters being rated according to ASTM standards.

| Hours in Tide | Rating | |
|---|---|---|
| | Unprimed panels | Primed panels |
| 24 | No blisters | No blisters. |
| 48 | Few—No. 8 | Do. |
| 100 | Few—No. 8 | Do. |
| 200 | Few—No. 7 | 1-2 No. 8. |

Blister sizes: Rated from No. 1 to No. 9, No. 9 being smallest rated.

Example 5

To styrene (40 parts), methyl methacrylate (40 parts), and maleic anhydride (10 parts) were added butyl hydrogen maleate (10 parts), 2-ethoxyethyl acetate (122.2 parts), and benzoyl peroxide (1 part). One-fourth of this mixture was heated to 110° C. At this temperature, the gradual addition of the remaining monomer-solvent-catalyst mixture was begun and required two hours and ten minutes to complete. Re-initiations with benzoyl peroxide (0.1 part) were made at three, four, and five hours' reaction time. The total polymerization cycle was eight hours. The polymer solution obtained was at about 45% solids and was diluted to 40% solids. The diluted polymer solution had a Gardner-Holdt viscosity of "X—" at 25° C., and an average molecular weight of about 50,000.

To the above polymer solution at 40% solids (92 parts) were added Epoxide A (8 parts), 2-ethoxyethyl acetate (12 parts), and 0.7 part of a 35% solution of trimethylbenzylammonium hydroxide in methanol. Films of this solution were cast on cold rolled steel, air-dried for thirty minutes, and baked for thirty minutes at 150° C. (300° F.). The clear, flexible coatings thus produced exhibited excellent resistance to 2-ethoxyethyl acetate, good adhesion, and good resistance to Tide.

Example 6

A coating composition was prepared from a mixture of 5.5 parts of Epoxide C with 120 parts of a 40% solution of a copolymer, having an average molecular weight of about 15,000, of 85% of methyl methacrylate and 15% of maleic anhydride in 2-ethoxyethyl acetate prepared as in Example 1.

The composition was applied on Bonderized steel panels, dried in air, and baked 30 minutes at 150° C. The coatings are resistant to detergents and have good solvent resistance.

Example 7

A coating composition was prepared from a mixture of 7.5 parts of Epoxide E with 120 parts of a 40% solution of a copolymer, having an average molecular weight of about 110,000, of 60% methyl methacrylate, 27% of ethyl acrylate, and 13% of maleic anhydride in 2-ethoxyethyl acetate prepared as in Example 1.

The composition was applied on Bonderized steel panels, dried in air, and baked 30 minutes at 150° C. The coatings are resistant to detergents and have good solvent resistance.

Example 8

A coating composition was prepared from a mixture of 6 parts of Epoxide F with 100 parts of a 40% solution of a copolymer, having an average molecular weight of about 30,000, of 30% of vinyltoluene, 28% of acrylonitrile, 30% of butyl acrylate, and 12% of maleic anhydride in 2-ethoxyethyl acetate prepared as in Example 1.

The composition was applied on Bonderized steel panels, dried in air, and baked 30 minutes at 150° C. The coatings are resistant to detergents and have good solvent resistance.

Example 9

A coating composition was prepared from a mixture of 4 parts of Epoxide A with 92 parts of a 40% solution of a copolymer, having an average molecular weight of about 50,000, of 10% styrene, 85% of methyl methacrylate, and 5% of maleic anhydride in 2-ethoxyethyl acetate prepared as in Example 1.

The composition was applied on Bonderized steel panels, dried in air, and baked 30 minutes at 150° C. The coatings are resistant to detergents and have good solvent resistance.

It is to be understood that changes and variations may be made without departing from the spirit and scope of the invention as defined in the appended claims.

We claim:

1. A coating composition comprising a solution in an organic solvent which is free of alcoholic and phenolic hydroxyl and amine groups of (1) 70% to 90% by weight of a linear addition copolymer, having a viscosity average molecular weight of about 10,000 to 120,000, of a mixture of styrene, methyl methacrylate, butyl hydrogen maleate, and 3% to 15% by weight of maleic anhydride, the amount of styrene being not over 50% by weight of the copolymer and the amount of butyl hydrogen maleate not being over 10% by weight of the copolymer, the anhydride groups being preserved in the units of the copolymer derived from the maleic anhydride, and (2) 10% to 30% by weight of a resin-forming polyepoxide containing at least two vicepoxy groups in which the oxygen atom is connected to adjoined carbon atoms connected together by a single valence bond and having a molecular weight of about 250 to 5,000.

2. A coating composition comprising a solution in an organic solvent which is free of alcoholic and phenolic hydroxyl and amine groups of (1) 70 to 90% by weight of a linear addition copolymer, having a viscosity average molecular weight of about 10,000 to 120,000, of a mixture of styrene, methyl methacrylate, ethyl acrylate, butyl hydrogen maleate, the amount of styrene being not over 50% by weight of the copolymer and the amount of ethyl acrylate not being over 65% by weight of the copolymer, and the amount of butyl hydrogen maleate being not over 10% by weight of the copolymer, and 3 to 15% by weight of maleic anhydride, the anhydride groups being preserved in the units of the copolymer derived from the maleic anhydride, and (2) 10 to 30% by weight of a resin-forming polyepoxide containing at least two vic-epoxy groups in which the oxygen atom is connected to adjoined carbon atoms connected together by a single valence bond and having a molecular weight of about 250 to 5,000.

References Cited in the file of this patent

UNITED STATES PATENTS

| | | |
|---|---|---|
| 2,604,464 | Segall et al. | July 22, 1952 |
| 2,607,761 | Seymour | Aug. 19, 1952 |
| 2,662,870 | Allenby | Dec. 15, 1953 |
| 2,768,153 | Shokal | Oct. 23, 1956 |
| 2,798,861 | Segall et al. | July 9, 1957 |
| 2,880,116 | Alps et al. | Mar. 31, 1959 |

FOREIGN PATENTS

| | | |
|---|---|---|
| 557,752 | Belgium | Nov. 23, 1957 |

OTHER REFERENCES

Armitage, Paint Manufacture, April (1948), vol. 18, 4, Leonard Hill Ltd., pp. 126–128.